…

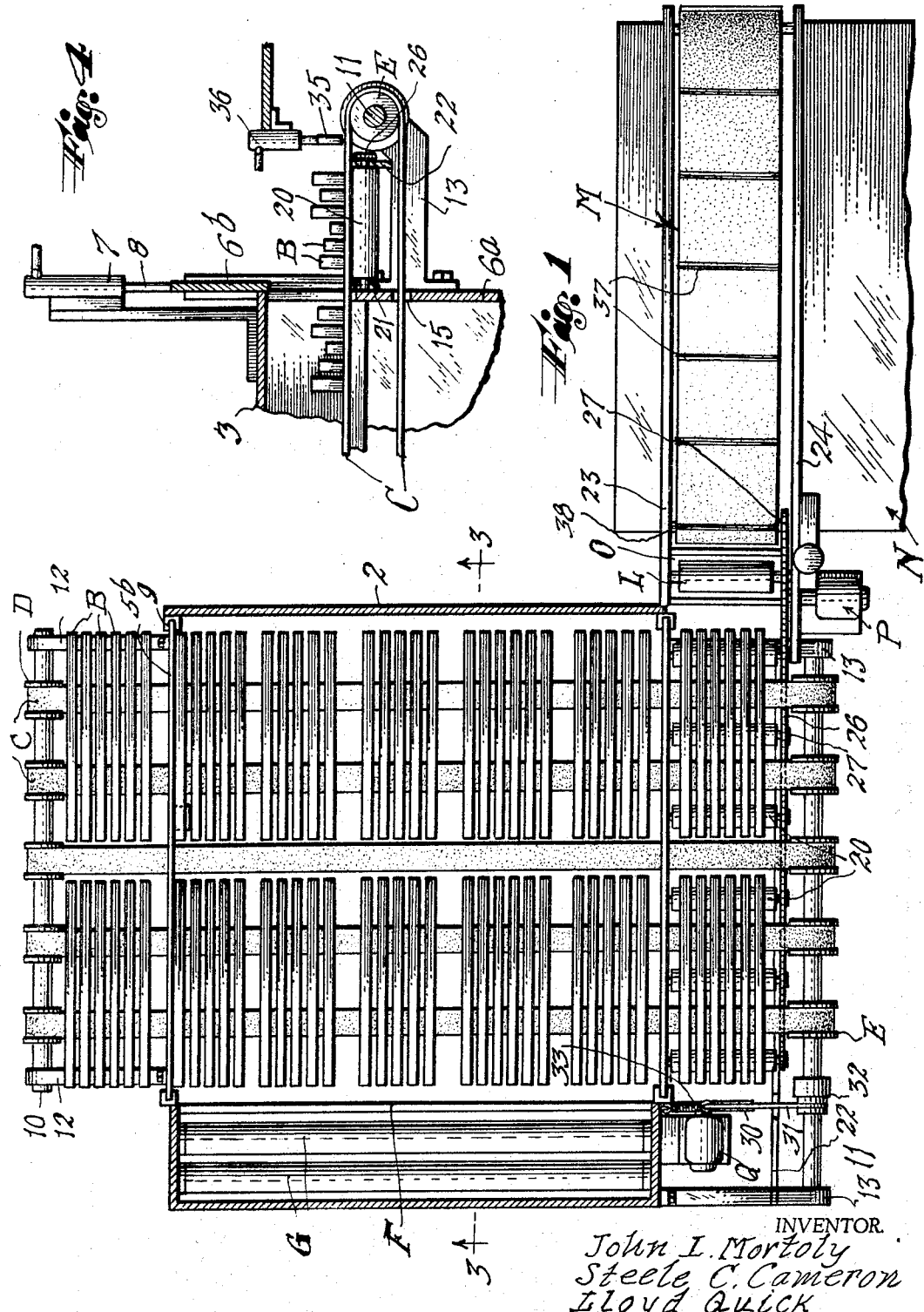

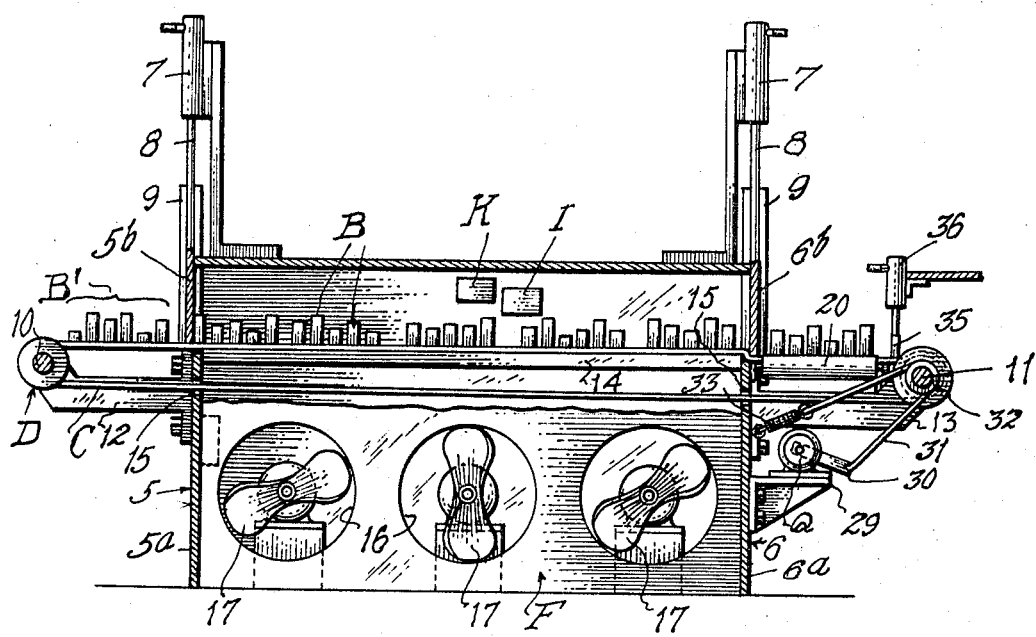

United States Patent Office 3,428,508
Patented Feb. 18, 1969

3,428,508
LUMBER CONDITIONING AND GLUING METHOD AND APPARATUS
Lloyd Quick, John L. Mortoly, and Steele P. Cameron, Poughkeepsie, N.Y., assignors to James L. Taylor Manufacturing Company, Poughkeepsie, N.Y., a corporation of New York
Filed Oct. 7, 1964, Ser. No. 402,254
U.S. Cl. 156—307       4 Claims
Int. Cl. C09j 5/06; B32b 21/04

ABSTRACT OF THE DISCLOSURE

A method and apparatus wherein members to be glued together are heated and moistened throughout their masses to a temperature above the heat-setting temperature of the adhesive as the members are conveyed through a chamber, then the surfaces to be bonded together are cooled and after a time delay adhesive is applied to said cool surfaces as the members are conveyed through a glue-applicator from which the members are conveyed to a gluing press where the adhesive is cured under pressure by the retained heat in the members.

---

This invention relates in general to the edge-gluing of pieces of wood or boards to form panels, and more particularly the invention contemplates the treatment of the boards prior to the application of the glue or other adhesive to the edges of the boards to condition the boards for gluing together in a gluing machine of a known type, for example a machine of the type shown in Patent No. 2,580,728.

A primary object of the invention is to provide a novel and improved method and machine to facilitate the edge-gluing of boards by the use of modern glues or adhesives of the synthetic resin type that are capable of quick-setting under heat, are strong, and are highly water resistant.

Another object is to provide a method and machine of this character wherein the boards are heated throughout their thickness in moist air to a pre-determined temperature of a range for example of about 100 degrees to 150 degrees Fahrenheit and then the edges of the boards are allowed to cool to a temperature of the order of 70 degrees F. to 100 degrees F. immediately prior to the application of the glue thereto, after which the glued boards are fed quickly into a gluing machine within their edges in abutting relation.

Another object of the invention is to provide a novel and improved lumber conditioner which embodies a novel and improved construction and combination of a heating chamber, means for moving boards step-by-step through the chamber, means for heating the air in the chamber and means for injecting moisture into the chamber and for circulating the warm moist air around the boards so as to heat the boards throughout their thickness to an approximately uniform temperature.

Other advantages and results of the invention will be brought out by the following description in conjunction with the accompanying drawings in which:

FIGURE 1 is a top plan view of a lumber conditioner and glue applicator embodying the invention, with the top wall of the heating chamber removed for clearness of illustration;

FIGURE 2 is a vertical longitudinal sectional view approximately on the plane of the line 2—2 of FIGURE 3 showing a batch of boards after they have been discharged from the chamber and placed on the take-away roller conveyor;

FIGURE 3 is a transverse vertical sectional view approximately on the plane of the line 3—3 of FIGURE 1; and FIGURE 4 is an enlarged fragmentary vertical sectional view of the discharge end of the heating chamber and board conveyor showing the portions of the parts immediately after the discharge of one batch of boards from the chamber and prior to the deposit of the heated boards on the take-away roller conveyor for movement thereof to the glue applicator.

Specifically describing the illustrated embodiment of the invention, the reference character A generally designates a casing having parallel side walls 1 and 2, a top wall 3, a bottom wall 4 which may be the floor on which the casing is set, and two end walls 5 and 6 that comprise the respective stationary lower portions 5a and 6a and the respective upper portions 5b and 6b that are shown respectively as the inlet door and the outlet door for the movement of boards B into and out of the chamber. These doors may be manually operated, but preferably are automatically operated, for example by pneumatic or hydraulic motors 7 the piston rod 8 of each of which is connected to the upper edge of the one door that is slidably mounted in suitable guides 9.

The boards B are moved through the heating chamber by a plurality of endless conveyor belts C that run over pulleys D and E mounted on shafts 10 and 11 which are journaled in the respective bearing brackets 12 and 13 which are secured on and project from the respective end walls of the casing. The upper reaches of the belts pass over support rails 14 that extend longitudinally of the casing and are suitably mounted on the end walls therewith with the upper reaches of the belts passing through the inlet or feed opening and the outlet or discharge opening, of the casing. The lower reaches of the belts pass freely through slots 15 in the end walls of the casing.

The casing provides within itself a heating chamber in which warm moist air is circulated around the boards in the chamber. While any suitable means may be utilized for properly circulating and humidifying the air in the chamber, for the purposes of illustration we have shown a vertical longitudinal partition F spaced from the side wall 1 of the casing and having its upper edge in spaced relation to the top wall 3 of the casing. Suitable heaters G are mounted in the casing between the side wall 1 and the partition F and preferably below the top of the partition F; and below the heaters and arranged in openings 16 in the partition, are air circulating fans 17 that are driven by motors 18. Any suitable means may be utilized for injecting moisture into the air to humidify it, and schematically we have shown a humidifier H that could be a valve controlled steam inlet the valve of which may be regulated by a suitable moisture responsive device I such as a known type of humidistat. The temperature in the chamber may be controlled in any suitable manner but preferably a thermostatic switch K for controlling the heaters G.

With this construction it will be observed that when the fans are operating and the heaters are energized and the humidifier is operating, the air in the chamber will be moistened by the humidifier heated by the heaters G and circulated by the fans 17 around the boards B as best indicated by arrows in FIGURE 3.

While the boards may be moved through the heating chamber by any of several different mechanisms, for simplicity in illustration, we have shown the conveyors and means for moving the conveyor belts simultaneously and intermittently so that one batch of boards is fed into the heating chamber at the same time that another batch of boards is discharged from the heating chamber. As shown in the drawings, the feeding ends of the conveyor belts extend beyond the side wall of the chamber a distance sufficient to permit a batch B′ of boards to be set thereon preferably with their edges horizontally disposed and with the boards extending transversely of the conveyor belts.

At the outlet or discharge end of the heating chamber, the conveyor belts also extend beyond the side wall of the chamber, a sufficient distance to support a batch of boards outside the chamber and in suitable relation to a take-away conveyor such that the boards are automatically removed from the belts and carried into contact with a glue applying roller L of known construction and thence to the loading conveyor M of the gluing machine of a suitable type generally designated N. The take-away conveyor is shown as comprising a plurality of rollers 20 journaled in a suitable supporting frame shown as comprising side bars 21 and 22 mounted on the side wall of the chamber and on the brackets 13. The glue applying roller L is shown as mounted in a suitable frame including side bars 23 and 24 with the lower portion of which periphery extending into a glue pot O as usual.

The take-off rollers 20 and the glue applying roller L are driven at the same peripheral speed and in the same direction by suitable means such as a motor reducer combination P secured on one of the frame bars 24 and having a sprocket on its output shaft meshing with a chain 26 that passes over sprockets 27 one of which is mounted on the shaft of each of the rollers 20, the chain also passing over a sprocket on the shaft of the glue applying roller L and preferably, although not necessarily, also having a driving connection with a sprocket on shaft 38 of the driving pulley of the outfeed conveyor M. The conveyor belts C are actuated by a suitable mechanism which is shown as including a motor-reducer combination Q mounted on a bracket 29 on the end wall 6 of the heating chamber and having a crank arm 30 on its output shaft. The crank arm is connected to one end of a flexible connector or chain 31 which passes around an over-running or "one direction" clutch 32 mounted on the conveyor shaft 11 and the other end of the chain is connected by tension spring 33 to the chamber wall.

In operation of the invention, the boards are laid on the feed end of the conveyor belts, on edge, and spaced from each other so that air can circulate between the boards, as indicated by B' in FIGURE 2. The heaters are turned on as are also the motors 18 of the fans so as to cause circulation of hot air in the chamber, and the temperature is maintained at about 130 degrees, depending upon the nature of the lumber and upon the adhesive being used. At the same time, live steam is introduced into the chamber through the humidifier H to maintain equilibrium moisture so that the boards do not dry out as a result of the high heat. The air is circulated at a fairly high speed, for example around 400 ft./min.

The inlet door 5b and outlet door 6b opens and the motor-reducer combination Q is started to actuate the conveyor belts with a step-by-step movement, the steps being of such length as to move the batch of boards B' into the heating chamber. Movement of these boards is continued step-by-step through the heating chamber, with the doors 5b and 6b opening and closing in timed relationship to the movement of batches of boards on conveyor belts C. Each batch of boards is placed on the feed end of the conveyor belts at the end of each step of movement. The hot moisture air in the chamber circulates around the boards and heats them throughout their thicknesses. Each batch remains in the chamber about eight to twelve minutes and as each batch approaches the outlet door 6b that door opens and the leading batch of boards is moved out of the heating chamber into a position above the take-away conveyor rollers 20 as shown in FIGURE 4. Then the discharge ends of the belts are depressed to cause the boards to drop into contact with the take-off rollers as shown in FIGURE 2. This operation may be effected in any suitable way, but as shown, when the outlet door 6b closes, it presses downwardly on the conveyor belts at one end of the take-away rollers, and simultaneously a presser bar 35 at the opposite ends of the rollers, presses the belts downwardly so that the portions of the belt between the door and the presser bar are slightly below the common plane of the highest points in the roller peripheries, as best shown in FIGURE 2. Both the door 6b and the presser bar may be manually operated, but it is of course preferred to have them automatically operated in some suitable manner, for example by the hydraulic motor 7 for the door and by a similar hydraulic motor 36 for the presser bar. Those skilled in the art will readily understand that suitable periodically actuated valves will be provided for controlling the flow of fluid under pressure to the motors 7 and 36.

The rollers 20 are intermittently driven by the motor-reducer combination P and after the boards contact the rollers, the boards are moved longitudinally over and into contact with the glue-applying roller or glue roll L so that the adhesive is applied to the bottom edges of the boards. This longitudinal movement is timed, i.e. the conveyor moves at such speed and distance as to allow a cooling period before boards pass over glue roll L. The glue-applying roller and the take-away roller 20 adjacent thereto continue the movement of the boards onto the press-loading conveyor M from which the boards are lifted by an operator and placed in the gluing press N in edge-to-edge abutting relation to each other. Preferably the conveyor M is of the slat type or has raised bars 37 thereon formed with sharp edges to prevent accumulation of the adhesive on the conveyor.

When the boards emerge from the heating chamber, they are heated approximately uniformly throughout, but their surfaces are allowed to cool quickly at room temperature before the adhesive is applied to the boards. The temperature of the boards will vary with the type of adhesive used, but generally the adhesive is of the quick-setting or rapid-curing synthetic resin type, and in most cases the temperature of the surfaces of the boards may be about room temperature around 70 degrees F. or more. However, during the heating period heat is stored in the board mass and the heat in the interior of the board greatly accelerates the speed of curing of the adhesive when the boards are assembled in edge-to-edge relation and pressed together in the gluing press.

It will be seen that an important feature of the invention is the heating of the boards throughout their masses to a substantially uniform temperature above the curing temperature of the adhesive being used and the subsequent cooling of the surfaces of the boards to a temperature that will prevent pre-curing of the adhesive after the adhesive is applied to said surfaces, and thereafter utilizing the heat as retained within the boards for accelerating the subsequent setting or curing of the adhesive in the glue press.

The most desirable direction of movement of the air is across the grain of the lumber while the boards are in the heating chamber, and while this desirable condition is not practically attainable, a 90 degree movement of the air with respect to the grain of the boards is closely approached by the provision of louvres and openings in the chamber for air passage.

While in the preferred method it is desirable to heat the boards throughout their masses to a temperature above the setting temperature of the adhesive, for example for a range of 100 degrees to 150 degrees F. and then cool the surfaces of the boards to about room temperature before the adhesive is applied to said surfaces in order to provide a rapid operation, it is possible to eliminate the separate cooling of the board surfaces by heating the boards in the heating chamber to a lower temperature for a longer period of time so that the heat retained in the board masses may still be utilized for accelerating the setting of the adhesive in the glue press.

It will be understood that the steps of the method and the construction of the board heater may be widely modified and changed without departing from the spirit and scope of the invention, and that the temperatures, humidity, velocity of movement of the boards and the velocity of the circulating air may be varied in accordance with the type of lumber, the type of adhesive and whether or not the machine is being operated during the summer months when the lumber is warm and the ambient air is warm and humid or during the winter months when the lumber is cold and the humidity of the ambient air is low.

We claim:

1. Apparatus for pre-conditioning boards prior to edge-gluing thereof, comprising a heating chamber having an inlet opening and an outlet opening, conveying means for moving boards step-by-step into said inlet opening, through the chamber and out of said outlet opening, means for circulating air in said chamber, means for heating said air, means for humidifying said air, a glue-applicator at one side of said outlet opening, a take-off conveyor adjacent said outlet opening to receive boards from said conveying means and move them through said glue-applicator for application of adhesive to one surface of each board, and a loading conveyor for a gluing press adjacent said glue-applicator for receiving said boards from the take-off conveyor and glue-applicator.

2. Apparatus as defined in claim 1 wherein said conveying means includes endless conveyor belts spaced apart horizontally with their upper reaches running through said inlet opening and said outlet opening to receive and hold boards extending transversely of said reaches, said means for heating the air includes electric heaters disposed at one side of said chamber, said chamber has a vertical partition between said heaters and said conveyor belts and provided with transverse holes therethrough, said means for circulating the air includes motor driven fans disposed in said holes for drawing air upwardly around said heaters, over said partition and across and downwardly between said conveyor belts.

3. A method of gluing with a heat-setting adhesive in which the members to be glued together are heated substantially uniformly throughout their masses to a temperature above the heat-setting temperature of the adhesive, certain surfaces of said members are then coated with a heat-setting adhesive, and said members approximately immediately are pressed together with the adhesive coated surface of one member in contact with a surface of another member, said method being characterized in that said members are heated to a temperature of the order of 100 degrees to 150 degrees F., and thereafter said members are subjected to a cooling atmosphere to cause said certain surfaces to cool while the interiorly retained heat in the members is maintained at substantially higher temperature immediately before the adhesive is applied to said certain surfaces and while the adhesive coated surface of one member is pressed into contact with the surface of another member.

4. A method of preconditioning boards prior to gluing thereof with a heat-setting adhesive, wherein the boards are heated substantially uniformly throughout their masses by circulating heated air around the boards above the setting temperature of the adhesive, the air is humidified and adhesive is applied to certain surfaces of the boards while the heat is retained in the board masses and approximately immediately prior to gluing of the boards together, said boards are heated first throughout their masses to a temperature of the order of 100 degrees to 150 degrees F. after which said certain surfaces of the boards are allowed to cool in air at a temperature of the order of 70 degrees F., immediately prior to the application of adhesive to said certain surfaces, and the adhesive is applied to said cool surfaces.

References Cited

UNITED STATES PATENTS

| 1,205,116 | 11/1916 | Slazenger | 156—322 X |
| 2,344,488 | 3/1944 | Bowling | 156—322 X |
| 2,593,708 | 4/1952 | Ware | 156—322 X |
| 2,919,732 | 1/1960 | McKean et al. | 156—322 X |
| 2,988,120 | 6/1961 | Forrest | 156—499 |

EARL M. BERGERT, *Primary Examiner.*

C. B. COSBY, *Assistant Examiner.*

U.S. Cl. X.R.

156—322, 497; 161—268